March 11, 1969
J. GROSS
3,431,822
OVER CENTER CRANK MEANS FOR PRODUCING RECIPROCATING MOTION
Filed March 14, 1967
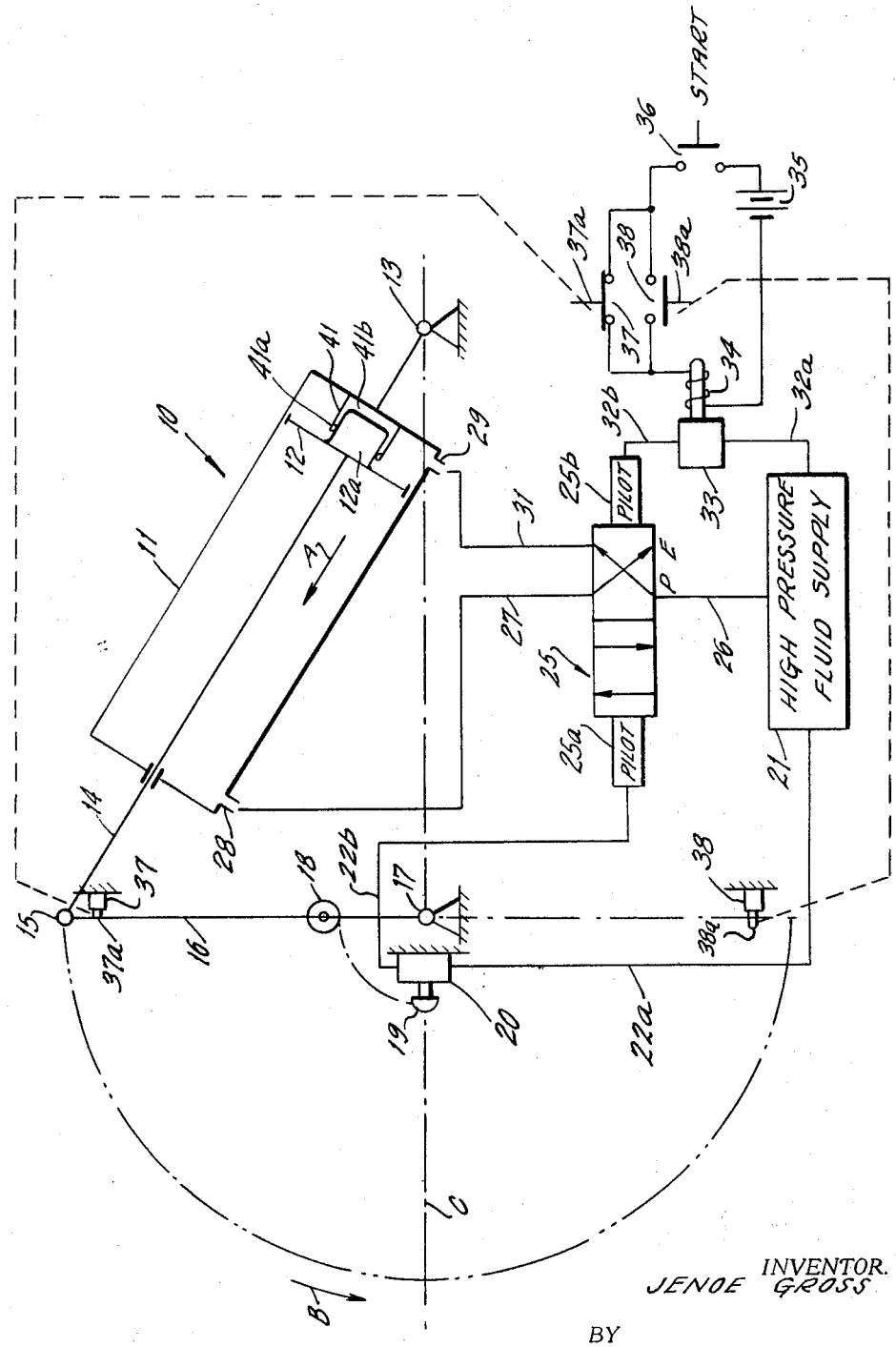
INVENTOR.
JENOE GROSS
BY
OSTROLENK, FABER, GERB & SOFFEN
ATTORNEYS

3,431,822
OVER CENTER CRANK MEANS FOR PRODUCING RECIPROCATING MOTION

Jenoe Gross, Kew Gardens, N.Y., assignor to Solidyne, Inc., Brooklyn, N.Y.
Filed Mar. 14, 1967, Ser. No. 623,111
U.S. Cl. 91—210                 10 Claims
Int. Cl. F01b *15/04;* F01l *25/08;* F15b *15/22*

ABSTRACT OF THE DISCLOSURE

A single double acting fluid (gas or liquid) cylinder is used to drive a crank arm with reciprocating angular motion. By operating the piston through a cycle consisting of its forward and return strokes to obtain unidirectional angular motion, the crank arm is driven in one direction and for the next operating cycle of the piston the crank arm is driven in reverse direction. At the end of the forward stroke of the piston, fluid pressure to the cylinder is automatically reversed so that the piston is driven in the reverse direction for the last half of the angular journey, yet crank arm motion continues in the same direction since one end of the cylinder moves about a fixed pivot while the other end is connected through the piston rod to the moving end of the crank arm.

---

This invention relates to intermittent drive mechanisms in general and more particularly relates to a novel construction utilizing a single double acting cylinder to achieve reciprocating angular motion with the direction of motion being the same throughout an entire cycle consisting of a complete forward and a reverse stroke of the piston.

In prior art devices utilizing double acting fluid cylinders to achieve reciprocating output motions, for a forward direction of output stroke the piston moved in one direction and for the reverse output stroke, the piston operated in the reverse direction. Thus, as will hereinafter become apparent, piston stroke had to be very long. Further, the forward and reverse output strokes were at different speeds since the forward and reverse piston strokes of a fluid cylinder are of different speeds.

The instant invention overcomes the aforesaid disadvantages of prior art devices by providing a double acting fluid cylinder mounted at one end to a swivel and having the piston rod project out the other end. A crank arm having one end mounted to a fixed pivot is pivotally connected at its other end to the piston rod. At the end of the piston stroke with the piston moving away from the swivel (forward stroke) the cylinder has moved to a position wherein the piston rod is disposed on a line extending through the swivel and pivot and at this time a switch operated by the crank arm reverses the direction of high pressure fluid applied to the cylinder thereby driving the piston in reverse direction. However, because of inertia, the crank arm continues to move in the same direction even though piston direction has reversed.

At the end of the piston return stroke, the system comes to rest. Upon the next forward stroke of the piston, the crank arm reverses direction and continues to move in this reverse direction through this second forward stroke of the piston and its subsequent return stroke.

Accordingly, a primary object of the instant invention is to provide a novel construction utilizing a driving means in the form of a double acting fluid cylinder or solenoid to obtain reciprocating motion.

Another object is to provide a novel construction of this type in which the driving means operates through a forward and reverse stroke cycle to achieve a unidirectional output stroke.

A further object is to provide a novel construction of this type which provides a reciprocating angular output and includes a fluid pocket shock absorbing stop means.

These objects as well as other objects of the instant invention will become readily apparent after reading the following description of the accompanying drawing in which the single figure thereof is a schematic representation of a reciprocating drive system constructed in accordance with the teachings of the instant invention.

Now referring to the figure. Driving means or operating means is in the form of double acting fluid cylinder 10 is mounted with one end of cylinder 11 connected to fixed swivel 13. Output member or piston rod 14 extends from piston 12 through the opposite end of cylinder 11 and is disposed so that the axis of rod 14 extends through swivel 13. The end of rod 14 remote from piston 12 is connected at pivot 15 to one end of crank arm 16 whose other end is mounted to fixed pivot 17.

Roller cam 18, mounted to crank arm 16 at a point intermediate the ends thereof, is engageable with push button 19 of switch 20 for depressing button 19 when crank arm 16 and piston rod 14 are parallel to each other at the mid position in the angular journey or stroke of crank arm 16. When button 19 is depressed, switch 20 connects high pressure fluid from supply 21 through line sections 22a, 22b to pilot 25a of four-way inpulse actuated valve 25 operating the latter from the position shown in the drawing to a position where high pressure fluid from supply 21 is connected through lines 26, 27 to port 28 at the end of cylinder 11 remote from swivel 13 and cylinder 11 is exhausted through line 31 connected to port 29 at the end of cylinder 11 nearer to swivel 13.

Valve 25 is also provided with pilot 25b which, when momentarily operated by high pressure fluid provided by supply 21 through line sections 32a, 32b, operates valve 25 to the position illustrated in the figure. Line sections 32a, 32b are connected by solenoid valve 33 when operating coil 34 is momentarily energized. One end of coil 34 is connected to the negative terminal of battery 35 having its positive terminal connected to one side of normally open start control switch 36. The other end of coil 34 is connected to one end of a parallel circuit consisting of interlock switches 37, 38 with the other end of the parallel circuit being connected to the other side of start control switch 36.

In the figure, the elements are shown in the positions they occupy immediately after momentary closing of start control 36. That is, in the positions shown, crank arm 16 depresses operating button 37a of interlock switch 37 to close the latter so that upon momentary closing of start control 36, coil 34 is energized operating switch 33 so that high pressure fluid from supply 21 energizes pilot 25b thereby operating air solenoid 25 to the position shown. High pressure fluid is introduced into cylinder 11 at port 29 thereby driving piston 12 forward in the direction indicated by arrow A. Piston rod 14 is ejected from cylinder 11 driving crank arm 16 away from switch 37 in a counterclockwise direction (indicated by arrow B) about pivot 17 as a center.

Cylinder 11 moves counterclockwise, about swivel 13 as a center, and at a point where piston rod 14 is aligned with crank arm 16, cam 18 depresses switch button 19 disposed on center line connecting pivot 17 and swivel 13. Depression of button 19 operates valve 20 to connect line sections 22a, 22b thereby introducing high pressure fluid from supply 21 to pilot 25a to operate solenoid valve 25 from the position shown in the figure to the position wherein port 28 is connected to supply 21 and port 29 is connected to exhaust. This causes piston 12 to move in its return stroke (opposite in direction to arrow A). However, the momentum of double acting cylinder 11 and crank arm 16 in moving counterclockwise carries piston rod 14 to an over-center position. That is, piston rod 14 is in a position slightly below center line C at the time when piston 12 begins its return stroke so that during this particular return stroke of piston 12, crank arm 16 continues to move counterclockwise.

At the end of the return stroke for piston 12, cylindrical extension 12a thereof enters cylinder 41 internal of cylinder 11 and secured to the rear end thereof. Resilient seal 41a secured internally of cylinder 41 at the forward end thereof is closely fitted with the outer end of extension 12a so that the fluid in pocket 41b provides a cushion which absorbs the energy of moving piston 12 bringing the latter to a halt. At this time, crank arm 16 depresses operating button 38a thereby closing switch 38 so that the next time start control 36 is closed there will be a complete energizing circuit for coil 34.

The second time start control 36 is operated momentarily and completes an energizing circuit for coil 34, pilot 25b is actuated to operate solenoid valve 25 to the position shown in the figure thereby introducing high pressure fluid from supply 21 to cylinder port 29. Piston 12 moves through its forward stroke driving crank arm 16 away from switch 38 in a clockwise direction about pivot 17 in a back direction (opposite to arrow B). At the midpoint of the back journey of crank arm 16, cam 18 engages button 19 and pilot 25a is actuated to operate solenoid valve 25 from the position shown in the figure so that high pressure fluid from supply 21 is introduced at cylinder port 28, causing piston 12 to move through its back stroke. In a manner previously described, the inertia of double acting cylinder 10 as well as crank arm 16 and the load connected thereto causes piston rod 14 to move past center line C in a clockwise direction so that during this return stroke of piston 12, crank arm 16 continues the last half of its back journey. Clockwise movement of crank arm 16 ceases when arm 16 engages switch button 37a and fluid pocket 41b halts the return stroke of piston 12.

Thus, it is seen that the instant invention provides novel means whereby the forward and return strokes of the piston in a double acting cylinder are combined into a cycle and utilized to achieve unidirectional motion, during each cycle, first in one direction and then in a reverse direction.

It should now be apparent to those skilled in the art that the respective fluid and electrically actuated elements illustrated in the figure may be replaced by equivalent electrically and fluid operated elements.

While the figure illustrates a system in which crank arm 16 operates through a 180° stroke, it should also be apparent to those skilled in the art that this operating stroke may be adjusted in length. A mechanism of the type illustrated and described herein is especially adapted for use in operating a two station work table where work pieces are loaded and taken off at one station and at the other station, a tool operates on the work pieces.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A drive means including a crank arm mounted at one end to a fixed pivot for movement thereabout in a front and a back journey; an operating means having an output member connected to said arm at its other end; a power source; control means providing first and second connections between said operating means and said power source for operation of said output member through a cycle comprising a forward and a return stroke; said output member moving in said forward stroke when said first connection is complete and moving in said return stroke when said second connection is complete; said crank arm moving in said front journey during alternate ones of said cycles and moving in said back journey during the remainder of said cycles; said control means including switch means automatically operable at the end of said forward stroke to complete said second connection.

2. Drive means as set forth in claim 1 in which the output member extends from one end of said operating means and the other end thereof is mounted to a fixed swivel about which said operating means pivots as said output member moves through said forward and said return strokes.

3. Drive means as set forth in claim 2 in which said output member and said arm are aligned at the end of said forward stroke.

4. Drive means as set forth in claim 2 in which both output member and said arm are aligned with a line extending through said pivot and said swivel when said output member is at the end of said forward stroke.

5. Drive means as set forth in claim 1 in which said arm carries means for operating said switch at the midpoints of each of said journeys.

6. Drive means as set forth in claim 1 in which said operating means comprises a double acting fluid cylinder and said output member comprises a piston; fluid cushion means to arrest movement of said piston at the end of said return stroke.

7. Drive means as set forth in claim 1 in which said operating member is guided for linear reciprocating components of motion.

8. Drive means as set forth in claim 7 in which the output member extends from one end of the said operating means and the other end thereof is mounted to a fixed swivel about which said operating means pivots as said output member moves through said forward and said return strokes.

9. Drive means as set forth in claim 8 in which said output member and said arm are connected at a pivot point; at the end of said forward stroke said point said swivel and said pivot all being located in a single plane.

10. Drive means as set forth in claim 1 in which said journeys are less than 360 degrees.

References Cited

UNITED STATES PATENTS

| | | | |
|---|---|---|---|
| 84,206 | 11/1868 | Millward | 91—210 |
| 483,014 | 9/1892 | Powers | 91—210 |
| 2,803,110 | 8/1957 | Chittenden | 91—275 |
| 3,016,047 | 1/1962 | MacDonough | 91—210 |
| 3,090,362 | 5/1963 | Rolls | 91—275 |

PAUL E. MASLOUSKY, *Primary Examiner.*

U.S. Cl. X.R.

91—275, 306, 394